Jan. 29, 1957 D. V. GEPPERT 2,779,903

SEMI-CONDUCTOR UNIT

Filed April 30, 1953

INVENTOR.
Donovan V. Geppert
BY Foorman L. Mueller
Atty

United States Patent Office 2,779,903

Patented Jan. 29, 1957

2,779,903

SEMI-CONDUCTOR UNIT

Donovan V. Geppert, Phoenix, Ariz., assignor to Motorola, Inc., Chicago, Ill., a corporation of Illinois Application April 30, 1953, Serial No. 352,105

5 Claims. (Cl. 317—235)

The present invention relates to semi-conductor transistor assemblies, and more particularly to an improved transistor assembly of the point contact type.

The point contact type of transistor usually comprises a crystal of semi-conductive material such as germanium or silicon that has been treated to exhibit, for example, "N" or negative characteristics. This is achieved, usually, by incorporating in the crystal a small amount of some valence V element such as arsenic as an actuating impurity, called a donor impurity. The crystal is suitably polished and etched to give it proper electrical characteristics, and the point contact type of transistor is provided with a pair of electrodes known respectively as emitter and collector whose extremities contact one surface of the crystal. A metal block or tab is also provided and affixed to another surface of the crystal to constitute what is termed a base electrode for the assembly. Negative-going voltage pulses are then impressed between each of the emitter and collector electrodes and the base during what is generally termed an electro-forming process to provide positive or "P" type areas within the crystal around the points of contact therebetween and the respective electrodes so that the assembly will exhibit desired transistor characteristics. This electro-forming process is particularly important in the case of the collector electrode.

The collector and emitter electrodes in the prior art transistors usually take the form of a pair of fine wires or thin metallic ribbons. In the construction of such units using fine wire electrodes for the emitter and collector electrodes, such wires are generally made of Phosphor bronze of about 2 mils diameter coming down to a pointed end of less than half a mil. This obviously represents a very fine wire which, in fact, is so fine that the operators have to handle the same under microscopes and use tweezers for the actual assembly. With such fine wires, and the minute germanium crystal utilized in present-day transistors, it has been found that an operator can assemble these pieces only for a short time each day with any degree of accurateness. This factor, of necessity, results in an extremely high cost for transistors manufactured in the above described manner using fine wires or ribbons for the collector and emitter electrodes.

The use of fine wires for the emitter and collector electrodes also constitutes a limitation on the power capabilities of the transistor because the power output is in part dependent on the heat dissipating capacity of electrodes. The heat dissipating capacity of the electrodes is in turn dependent upon the surface area of the electrodes in accordance with the following relation:

$$P=P_0\,(1-\epsilon^{-KA})$$

P is dissipation for element of area A
$P_0$ is dissipation for element of infinite area
K is a constant depending upon the geometry and nature of the surface Therefore, when wire or ribbon electrodes are used whose surface area is inherently limited, the power output capabilities of the transistor are correspondingly limited as is the amount of current that can safely be passed through the device without damaging the electrodes. Typical maximum value of emitter current in commercially available prior art units are, for example, 1 to 5 milliamperes; whereas typical maximum values of collector power dissipation in such units are from 30 to 100 milliwatts. The prior art transistors, moreover, must be carefully protected from excessive current surges as, for example, may occur if the device is plugged into or removed from a circuit with the power applied, this being due to the sensitive nature of the emitter and collector electrodes.

Another disadvantage in the use of fine wires or ribbons for the emitter and collector electrodes lies in the electro-forming process. As previously mentioned, electro-forming constitutes the processing of an assembled transistor by running a current through the same to condition the germanium crystal immediately adjacent the point of contact between the respective collector and emitter electrodes and the germanium itself, especially at the point of contact of the collector electrode. The formed area is called a "P" region. The entire block of germanium prior to being formed is of the "N" type and after forming, there is a "P" region within the block immediately adjacent the point of contact of the collector electrode while the remainder of the germanium block is of the "N" characteristic. More specifically, the "P" region at the point of contact of the collector electrode with the germanium is like a shallow dish that completely encircles the point of contact and goes to a shallow depth into the block itself. Electro-forming takes only a fraction of a second, and for satisfactory forming, a relatively high current from the collector electrode through the germanium block to the base electrode with the collector negative is required. When a fine wire collector electrode is used, severe limitations are imparted both on the time of electro-forming and the amount of current permissible so that under some conditions, satisfactory electro-forming cannot be realized.

The present invention will be described in conjunction with the N type of point contact transistor which has the aforementioned P type area adjacent at least the collector electrode, but it is to be understood that the invention is applicable also to a P type point contact transistor having an N area adjacent the point of contact of the collector electrode.

It is an object of the present invention to provide an improved contact transistor assembly which may be constructed in a simple manner as compared with the prior art devices, and which does not require an undue amount of manual dexterity in its fabrication.

Another object of the invention is to provide such an improved point contact transistor unit which is constructed so that its power handling capabilities, as compared with prior art devices, are substantially increased.

Yet another object of the invention is to provide an improved transistor unit that is not subject to electrode failure in the presence of momentary overload.

A still further object of the invention is to provide an improved transistor device that is extremely rugged in construction and which exhibits a high degree of mechanical stability.

An additional object of the invention is to provide such an improved transistor unit that may be subjected to adequate electro-forming without the possibility of damaging the structure thereof.

A feature of the invention is the provision of an improved point contact transistor unit that is constructed in a unique manner to incorporate collector and emitter electrodes in the form of metallic plates which are mounted and spaced within the unit in such a manner as to facilitate the construction of the unit.

Another feature of the invention is the provision of an improved contact transistor unit that is constructed in a unique manner to incorporate collector and emitter electrodes in the form of metallic plates having appreciable dissipating capabilities so as to provide relatively high power potentialities for the unit as compared with prior art devices.

A still further feature of the invention is the provision of such an improved point contact transistor unit in which the metal plate electrodes are mounted within the unit to extend perpendicularly to an edge of the transistor crystal in mutually spaced parallel relation and to have respectively sharpened edges in point contact with the transistor edge.

Yet another feature of the invention is the provision of such an improved point contact transistor in which the contacting edges of the metal electrodes are inclined to one another to increase the stability of the assembled unit and the ease with which it may be manufactured.

The above and other features of the invention which are believed to be new are set forth with particularity in the appended claims. The invention itself, however, together with further objects and advantages thereof, may best be understood by reference to the following description when taken in conjunction with the accompanying drawing in which:

The present invention provides a circuit element in the form of a transistor assembly that includes a block of semi-conductive material having a pair of faces forming a line of juncture therebetween, and also having at least one metallic plate having substantial heat dissipating characteristics disposed in a plane traversing such line of juncture and having an edge in contact with such line, whereby the plate constitutes an electrode for the semi-conductive block.

Figure 1:
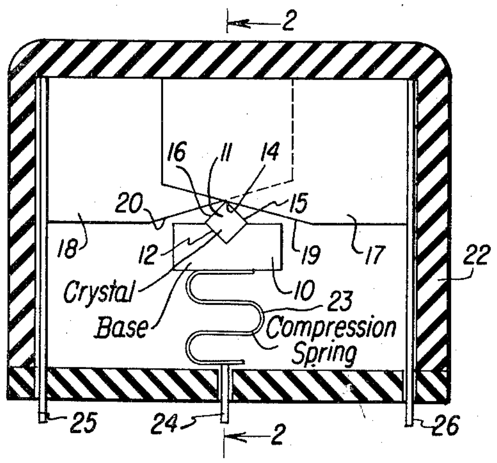
Figure 1 is a view, partly in section, of a transistor assembly constructed in accordance with the invention.
Figure 2:
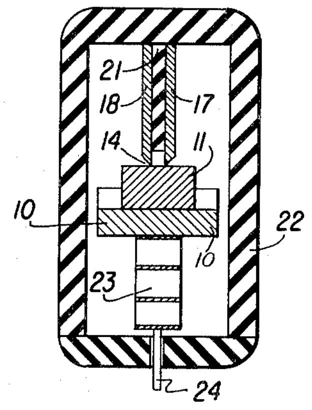
Figure 2 is a sectional view of the assembly taken along the lines 2—2 of Figure 1.

Reference is now made to Figures 1 and 2 in which one embodiment of the transistor assembly of the invention is illustrated on an enlarged scale for purposes of clarity. The assembly includes a metallic block 10 which, for example, may be brass or any other suitable metal, and which has a V-shaped groove or crevice 12 formed in its upper surface. A parallelopiped-shaped block 11 of semi-conductive material such as an N-type germanium crystal, is supported within crevice 12 with a pair of its sides lying along the sides of the crevice and with the line of juncture between these sides disposed at the apex of the crevice. The semi-conductor block 11 is maintained within the crevice by a suitable solder bond between its aforementioned sides and the sides of the crevice in metallic block 10.

Metallic block 10 forms a base electrode for the crystal 11, and it has proved advantageous to mount the crystal within a groove in the metallic block since such an arrangement is ideally suited for receiving the crystal which usually has a commercial form of a parallelopiped, and with such a mounting arrangement no further cutting operations on the crystal are required as is the case, for example, when the crystal is mounted on the flat surface of a block such as block 10.

As shown in the drawing, the crystal 11 has an upper line of juncture 14 between two adjacent faces 15 and 16, the line of juncture 14 being disposed opposite to the aforementioned line of juncture of the faces of crystal 11 within crevice 12. The emitter electrode 17 and collector electrode 18 of the assembly are in the form of metallic plates and are supported in mutually parallel planes traversing the line of juncture 14 and each being perpendicular to such line. Electrodes 17 and 18 have respective edges 19 and 20, each sharpened to a knife edge, contacting the line of juncture 14. The edges 19 and 20 are inclined, for example, by an angle of 150° to one another to form an apex at which line of juncture 14 is disposed. The aforementioned electrode plates 17 and 18 may, for example, be composed of brass or bronze and each may have, for example, a height of the order of ¼", a width of the order of ⅜" and a thickness of .005".

The metallic plate electrodes 17 and 18 are separated from one another by an insulating spacer 21 which, for example, may be composed of mica. The electrodes are attached to the mica spacer by any suitable means, such as an adhesive between the mica and electrodes. The spacing between electrodes 17 and 18 is preferably of the order of .001–.003".

The entire assembly may be mounted in a suitable housing 22 in which electrodes 17 and 18 are solidly supported, and block 10 is supported by a resilient compression spring 23 and urged upwardly so that line of juncture 14 of crystal 11 bears against the aforementioned contacting edges 19 and 20 of electrodes 17 and 18 at the apex formed by such edges. Electrical connection may be made to block 10 by a metallic pin 24 connected to resilient spring 23, and connections may be made to electrodes 17 and 18 by respective metallic pins 25 and 26 secured to the electrodes and extending through the bottom of housing 22.

Figure 3:
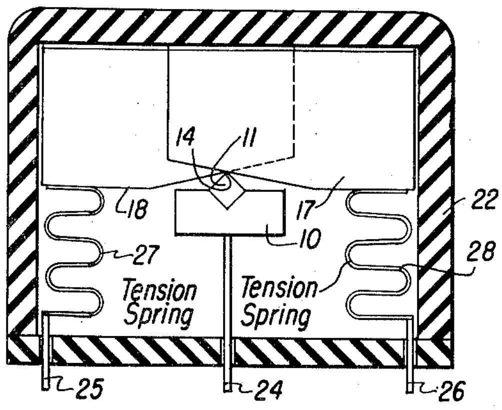
Figure 3 is a view, partly in section, of a modification of the invention.

The modification of Figure 3 is similar to that of Figures 1 and 2, with the exception that base 10 is solidly supported within housing 22 by pin 24, and the edges 19, 20 of electrodes 17 and 18 are resiliently held in contact with edge 14 of crystal 11 by a pair of resilient tension springs 27—28 respectively secured to electrodes 17 and 18 and to pins 25 and 26.

The provision of electrodes 17 and 18 with inclined edges 19 and 20 in contact with the aforementioned line of juncture 14 is an important feature of the invention. One advantage of the arrangement is the greater mechanical stability resulting therefrom. If edges 19 and 20 were not inclined, the electrode plates 17 and 18 would be discouraged from transverse motion across the line of juncture 14 only by the frictional force between the two. With the inclined edges, however, transverse motion across the edge of the germanium crystal is impeded not only by the frictional force but by the necessity for additional spring compression or tension accompanying such motion which at the same time would increase the frictional forces and thus further discourage motion.

As previously pointed out, it is usual practice during the construction of the transistor unit to electro-form the semi-conductive block or crystal 11 to provide a "P" type area adjacent each of the electrodes 17 and 18. This is achieved by applying the negative pulses between the collector electrode (17 or 18) and base 10. During such electro-forming process, it was found that the transistor assembly of the invention was able to withstand negative current pulses of tthe order of 1 ampere for about a half-second, which facilitated the electro-forming process and rendered it possible to impart transistor characteristics to the assembly. Such large currents would have completely destroyed the fine wire collector electrode used in prior art units.

In a constructed embodiment of the invention, a power amplification of 19 db was obtained using a 4700 ohm load resistor in the collector circuit, and with a collector bias of −45 volts. Using a collector bias of −28 volts and collector current of 35 milliamperes, a power dissipation of 1 watt in the collector electrode was obtained. The unit operated for 2½ hours under these conditions and at an ambient temperature of 25° C. without suffering any damage whatever. Moreover, a steady emitter current of 45 milliamperes was passed during another test without damaging the assembly. The above and other specific values have been given, of course, merely by way of explanation and are not to be construed as limiting the invention in any way.

In addition to its increased power capabilities, the transistor unit of the invention is more rugged from a mechanical standpoint as compared with the prior art devices since, instead of using delicate fine wire or strip collector and emitter electrodes, sturdy metallic plates are used. Moreover the assembly of the invention may be manufactured with utmost simplicity since accurate spacing is obtained between the emitter and collector electrodes by the proper choice of the mica spacer and the complete unit may be assembled without the requirement for any appreciable amount of dexterity.

To further summarize the problems representative of the prior art assemblies, which are successfully solved by the present invention, the difficulty of manufacturing point contact type transistor units is obviated since the prior art use of fine wire electrodes in conjunction with elements that are microscopic in size is not adhered to so that the difficulties of assembling such components into transistors do not arise. Moreover, the prior art fine wire type of transistor unit represents a rather fragile assembly both from a mechanical and electrical standpoint, and the mechanical fragility is overcome by the rugged construction of the present invention and the electrical fragility is overcome by the provision of plates having a relatively high heat dissipation to allow greatly increased current and power handling capability.

Consequently, the present invention generally provides lower cost production, and a mechanical unit having the ability to handle relatively large currents without the danger of burning or destruction. This, in turn, means greater power output and longer life for transistor units constructed in accordance with the invention.

While particular embodiments of the invention has been shown and described, modifications may be made and it is intended in the appended claims to cover all such modifications as fall within the true spirit and scope of the invention.

I claim:

1. A circuit element including in combination, a block of semi-conductive material having a pair of faces forming a line of juncture therebetween, and a pair of spaced mutually parallel metallic plates each having substantial heat dissipating characteristics and disposed in respective parallel planes perpendicular to and traversing such line of juncture, said plates having respective edges inclined one to the other to form an apex therebetween, and said edges being in respective point contact with the aforesaid line of juncture at said apex, whereby said plates constitute electrodes for said block of semi-conductive material.

2. A circuit element including in combination, a block of semi-conductive material having a pair of faces forming a line of juncture therebetween, a pair of spaced mutually parallel metallic plates each having substantial heat dissipating characteristics and disposed in respective parallel planes perpendicular to and traversing such line of juncture, said plates having respective edges inclined one to the other and in contact with the aforesaid line of juncture at an apex formed by said edges, whereby said plates constitute electrodes for said block of semi-conductive material, a metallic block affixed to the aforesaid block of semi-conductive material to constitute a further electrode therefor, and resilient means for maintaining said block of semi-conductive material in contact with the aforesaid inclined edges of said metallic plates with the aforesaid line of juncture disposed at the aforesaid apex formed by said last mentioned edges.

3. A circuit element including in combination, a block of semi-conductive material having a pair of faces forming a line of juncture therebetween, a pair of spaced mutually parallel metallic plates each having substantial heat dissipating characteristics and disposed in respective parallel planes perpendicular to and traversing such line of juncture, said plates having respective edges inclined one to the other and in contact with the aforesaid line of juncture at an apex formed by said edges whereby said plates constitute electrodes for said block of semi-conductive material, a metallic block affixed to the aforesaid block of semi-conductive material to constitute a further electrode therefor, a casing for the circuit element rigidly supporting said plates within the aforesaid respective planes, and a compression spring engaging said casing and metallic block for resiliently maintaining said block of semi-conductive material in contact with the aforesaid inclined edges of said metallic plates with the aforesaid line of juncture disposed at the aforesaid apex formed by said last mentioned edges.

4. A circuit element including in combination, a block of semi-conductive material having a pair of faces forming a line of juncture therebetween, a pair of spaced mutually parallel metallic plates having substantial heat dissipating characteristics and disposed in respective parallel planes perpendicular to and traversing such line of juncture, said plates having respective edges inclined one to the other and in contact with the aforesaid line of juncture at an apex formed by said edges, whereby said plates constitute electrodes for said block of semi-conductive material, a metallic block affixed to the aforesaid block of semi-conductive material to constitute a further electrode therefor, a casing for the circuit element rigidly supporting said metallic block, and a pair of tension springs engaging said casing and said metallic plates for resiliently maintaining said block of semi-conductive material in contact with the aforesaid inclined edges of said metallic plates with the aforesaid line of juncture disposed at the aforesaid apex formed by said last mentioned edges.

5. A circuit element including in combination, a block of semi-conductive material having a pair of mutually inclined faces forming a line of juncture therebetween, a pair of spaced metallic plates having substantial heat dissipating characteristics and disposed in respective planes traversing such line of juncture, said plates having respective edges inclined to one another and in contact with the aforesaid line of juncture at an apex formed by said edges, whereby said plates constitutes electrodes for said block of semiconductive material, and resilient means for maintaining said block of semiconductive material in contact with said inclined edges of said metallic plates with said line of juncture disposed at said apex formed by said inclined edges.

References Cited in the file of this patent

UNITED STATES PATENTS

| | | |
|---|---|---|
| 2,609,427 | Stelmak | Sept. 2, 1952 |
| 2,615,965 | Amico | Oct. 28, 1952 |
| 2,629,767 | Nelson et al. | Feb. 24, 1953 |
| 2,695,979 | Creighton | Nov. 30, 1954 |
| 2,696,574 | Rich | Dec. 7, 1954 |
| 2,696,575 | Fogg | Dec. 7, 1954 |